United States Patent
Musso et al.

(10) Patent No.: US 6,753,356 B2
(45) Date of Patent: Jun. 22, 2004

(54) FOAMING COMPOSITIONS

(75) Inventors: Ezio Musso, Alessandria (IT); Giampiero Basile, Alessandria (IT); Sauro Girolomoni, Alessandria (IT)

(73) Assignee: Ausimont S.p.A., Milan (IT)

(*) Notice: Subject to any disclaimer, the term of this patent is extended or adjusted under 35 U.S.C. 154(b) by 0 days.

(21) Appl. No.: 09/375,239

(22) Filed: Aug. 16, 1999

(65) Prior Publication Data

US 2001/0011107 A1 Aug. 2, 2001

(30) Foreign Application Priority Data

Aug. 19, 1998 (IT) .......................... MI98A1905

(51) Int. Cl.$^7$ .............. C08J 9/14; C08J 9/08; C09K 5/04; C08K 5/06
(52) U.S. Cl. .......... 521/114; 252/67; 252/68; 252/364; 510/408; 510/415; 521/87; 521/88; 521/97; 521/98; 521/113; 521/117; 521/130; 521/131
(58) Field of Search .............. 252/67, 68, 364; 510/408, 415; 521/87, 88, 97, 98, 113, 114, 117, 130, 131

(56) References Cited

U.S. PATENT DOCUMENTS

| 5,484,546 | A | * | 1/1996 | Minor et al. ............... 252/67 |
| 5,605,882 | A | * | 2/1997 | Klug et al. ............... 510/411 |
| 5,648,016 | A | * | 7/1997 | Klug et al. ............... 252/67 |
| 5,779,931 | A | * | 7/1998 | Klug et al. ............... 252/67 |
| 6,255,273 | B1 | * | 7/2001 | Musso et al. ............ 510/411 |
| 6,399,562 | B2 | * | 6/2002 | Basile et al. ............ 510/411 |
| 6,458,862 | B1 | * | 10/2002 | Musso et al. ............ 521/131 |

FOREIGN PATENT DOCUMENTS

EP    0 695 775 B1    12/1998

* cited by examiner

Primary Examiner—Rabon Sergent
(74) Attorney, Agent, or Firm—Arent Fox PLLC

(57) ABSTRACT

Use as foaming agents having a low environmental impact of azeotropic or near azeotropic compositions using difluoromethoxy-bis(difluoromethyl ether) and/or 1-difluoromethoxy-1,1,2,2-tetrafluoroethyl difluoromethyl ether.

15 Claims, No Drawings

FOAMING COMPOSITIONS

The present invention relates to azeotropic or near azeotropic compositions to be used as trichlorofluoromethane (CFC 11) substitutes in the foaming field.

More specifically the present invention relates to azeotropic or near azeotropic mixtures characterized by zero ODP (Ozone Depletion Potential), low GWP (Global warming Potential) and VOC (Volatile Organic Compounds) values.

The foamed polyurethanes represent a class of materials widely used for applications concerning the furnishing, car and in general transport, building and cooling industry.

Polyurethanes are polyaddition products between isocyanates and polyols; depending on the precursor features, it is possible to obtain flexible, rigid foams, or foams having intermediate characteristics.

The former are used in the furnishing and car sector, while rigid polyurethanes are widely used in the thermal insulation field for building and cooling industry.

All the polyurethane foams require a foaming agent for their preparation in order to obtain cellular structures, density, mechanical and insulation properties suitable for any application type.

As known, the common foaming agent used for the preparation of foamed polyurethanes has been for a long time CFC 11.

CFCs and specifically CFC 11 have, however, the drawback to show a high destroying power on the stratospheric ozone layer, therefore, the production and commercialization have been subjected to rules and then banned since Jan. 1, 1995.

In the foamed polyurethane field, the use versatility of these products, which allows applications in different fields with the use of suitable technologies and raw material formulations, has made impossible the identification of a single product valid for the replacement of CFC 11 in all applications.

The alternative solutions which now result widely used foresee the use of hydrocarbons (n-pentane, iso-pentane and cyclo-pentane) or of HCFC 141b (1,1-dichloro-1-fluoroethane).

Hydrocarbons, due to their high flammability, have not a generalized use and require large investments to avoid fire and explosion risks in plants using them. Furthermore, these foaming agents constitute an atmospheric pollution source since, if exposed to the sun light in the presence of nitrogen oxides, they undergo oxidative degradation phenomena, with formation of the 90 called ozone-rich "oxidizing smog". Due to this negative characteristic, these products are classified as VOC compounds (Volatile Organic Compound). HCFC 141b, which has been and is one of the most valid substitutes for above applications, has however the drawback to be moderately flammable and especially to be characterized by an ODP value equal to 0.11 (CFC 11 has ODP=1) and therefore it has been subjected to restricted use. There was a need to have available substitutes able to furtherly limit or overcome the above mentioned environmental and safety problems and which allow a simpler and generalized use as foaming agents.

In a previous patent application in the name of the Applicant foaming compositions using specific hydrofluoropolyethers have been described. However said hydrofluoropolyethers are very expensive for their obtainment process.

The need was therefore felt to have available foaming compositions based on said hydrofluoropolyethers (HFPE) having an azeotropic or near azeotropic behaviour as to be used as substitute of CFC 11 but with low environmental impact expressed in terms of ODP, GWP and VOC values.

The Applicant has unexpectedly found that the hydrofluoropolyether-based mixtures (HFPE), object of the present invention, are characterized by chemical-physical properties such to be suitable as substitutes of CFC 11, they have an environmental impact expressed in terms of ODP equal to zero and low GWP and VOC values.

It is an object of the present invention azeotropic or near azeotropic compositions to be used as foaming agents having a low environmental impact, consisting essentially of:

|  |  | composition % by weight | |
|---|---|---|---|
|  |  | general | preferred |
| I) | difluoromethoxy bis(difluoromethyl ether) ($HCF_2OCF_2OCF_2H$); | 1–95 | 25–95 |
|  | n-pentane | 99–5 | 75–5 |
| II) | difluoromethoxy bis(difluoromethyl ether) ($HCF_2OCF_2OCF_2H$); | 1–99 | 25–98 |
|  | iso-pentane | 99–1 | 75–2 |
| III) | difluoromethoxy bis(difluormethyl ether) ($HCF_2OCF_2OCF_2H$); | 1–60 | 20–60 |
|  | dimethyl ketone (acetone) | 99–40 | 80–40 |
| IV) | difluoromethoxy bis(difluoromethyl ether) ($HCF_2OCF_2OCF_2H$); | 1–99 | 10–98 |
|  | 1,1,1,3,3-pentafluorobutane ($CF_3CH_2CF_2CH_3$, HFC 365 mfc) | 99–1 | 90–2 |
| V) | difluoromethoxy bis(difluoromethyl ether) ($HCF_2OCF_2OCF_2H$); | 1–40 | 10–40 |
|  | 1,1,1,4,4,4-hexafluorobutane ($CF_3CH_2CH_2CF_3$, HFC 356 ffa) | 99–60 | 90–60 |
| VI) | difluoromethoxy bis(difluoromethyl ether) ($HCF_2OCF_2OCF_2H$); | 1–96 | 25–96 |
|  | methoxymethyl methylether | 99–14 | 75–14 |
| VII) | difluoromethoxy bis(difluoromethyl ether) ($HCF_2OCF_2OCF_2H$); | 30–99 | 35–98 |
|  | n-hexane | 70–1 | 65–2 |
| VIII) | 1-difluoromethoxy 1,1,2,2-tetrafluoroethyl difluoromethyl ether ($HCF_2OCF_2CF_2OCF_2H$); | 1–93 | 25–93 |
|  | n-pentane | 99–7 | 75–7 |
| IX) | 1-difluoromethoxy 1,1,2,2-tetrafluoroethyl difluoromethyl ether ($HCF_2OCF_2CF_2OCF_2H$); | 30–99 | 50–98 |
|  | dimethyl ketone (acetone) | 70–1 | 50–2 |
| X) | 1-difluoromethoxy 1,1,2,2-tetrafluoroethyl difluoromethyl ether ($HCF_2OCF_2CF_2OCF_2H$); | 15–99 | 25–98 |
|  | n-hexane | 85–1 | 75–2 |
| XI) | 1-difluoromethoxy 1,1,2,2-tetrafluoroethyl difluoromethyl ether ($HCF_2OCF_2CF_2OCF_2H$); | 5–99 | 10–98 |
|  | ethyl alcohol | 95–1 | 90–2 |

Difluoromethoxy-bis (difluoromethyl ether) is indicated as HFPE1; 1-difluoromethoxy-1,1,2,2-tetrafluoroethyl difluoromethyl ether is indicated as HFPE2. More specifically the azeotropic compositions, in correspondence of which an absolute minimum or maximum in the boiling temperature at the pressure of 1.013 bar with respect to the pure products is noticed, are defined as follows:

| | | Compositions are defined within +/−2% by weight |
|---|---|---|
| A) | difluoromethoxy-bis(difluoromethyl ether) ($HCF_2OCF_2OCF_2H$); | 62% by wt. |
| | n-pentane | 38% by wt. |
| B) | difluoromethoxy-bis(difluoromethyl ether) ($HCF_2OCF_2OCF_2H$); | 63% by wt. |
| | iso-pentane | 36% by wt. |
| C) | difluoromethoxy-bis(difluoromethyl ether) ($HCF_2OCF_2OCF_2H$); | 42% by wt. |
| | dimethyl ketone (acetone) | 58% by wt. |
| D) | difluoromethoxy-bis(difluoromethyl ether) ($HCF_2OCF_2OCF_2H$); | 60% by wt. |
| | 1,1,1,3,3-pentafluorobutane ($CF_3CH_2CF_2CH_3$, HFC 365 mfc) | 40% by wt. |
| E) | difluoromethoxy-bis(difluoromethyl ether) ($HCF_2OCF_2OCF_2H$); | 20% by wt. |
| | 1,1,1,4,4,4-hexafluorobutane ($CF_3CH_2CH_2CF_3$, HFC 356 ffa) | 80% by wt. |
| F) | difluoromethoxy-bis(difluoromethyl ether) ($HCF_2OCF_2OCF_2H$); | 59% by wt. |
| | methoxymethyl methyl ether | 41% by wt. |
| G) | difluoromethoxy-bis(difluoromethyl ether) ($HCF_2OCF_2OCF_2H$); | 75% by wt. |
| | n-hexane | 25% by wt. |
| H) | 1-difluoromethoxy-1,1,2,2-tetrafluoroethyl difluoromethyl ether ($HCF_2OCF_2CF_2OCF_2H$); | 61% by wt. |
| | n-pentane | 39% by wt. |
| I) | 1-difluoromethoxy-1,1,2,2-tetrafluoroethyl difluoromethyl ether ($HCF_2OCF_2CF_2OCF_2H$); | 79% by wt. |
| | dimethyl ketone (acetone) | 21% by wt. |
| L) | 1-difluoromethoxy-1,1,2,2-tetrafluoroethyl difluoromethyl ether ($HCF_2OCF_2CF_2OCF_2H$); | 74% by wt. |
| | n-hexane | 26% by wt. |
| M) | 1-difluoromethoxy-1,1,2,2-tetrafluoroethyl difluoromethyl ether ($HCF_2OCF_2CF_2OCF_2H$); | 95% by wt. |
| | ethyl alcohol | 5% by wt. |

The mixtures having an azeotropic or near azeotropic behaviour are of great importance in order to avoid fractionation or considerable variations of their composition during handling, dosage and storage operations wherein accidental losses can take place due to liquid evaporation and consequently variations of the composition of the fluid.

The composition variations which take place in all the cases when non azeotropic mixtures are used, involve deviations of the foaming agent performances and the need to make suitable refillings in order to restore the original composition and therefore the mixture chemical-physical characteristics.

Furthermore, when the non azeotropic or non near-azeotropic compositions contain more volatile flammable components, the vapour phase becomes rich in such component until reaching the flammability limit, with evident risks for the use safety. Likewise, when the flammable component is less volatile, it concentrates in the liquid phase giving rise to a flammable liquid.

Mixtures having azeotropic or near azeotropic behaviour avoid the above disadvantage even when a flammable compound is present.

An azeotrope is a particular composition which has singular chemical-physical, unexpected and unforeseeable properties of which the most important ones are reported hereinafter.

An azeotrope is a mixture of two or more fluids which has the same composition in the vapour phase and in the liquid one when it is in equilibrium under determined conditions.

The azeotropic composition is defined by particular temperature and pressure values; in these conditions the mixtures undergo phase changes at constant composition and temperature as pure compounds.

A near azeotrope is a mixture of two or more fluids which has a vapour composition substantially equal to that of the liquid and undergoes phase changes without substantially modifying the composition and temperature. A composition is near azeotropic when, after evaporation at a constant temperature of 50% of the liquid initial mass, the per cent variation of the vapour pressure between the initial and final composition results lower than 10%; in the case of an azeotrope, no variation of the vapour pressure between the initial composition and the one obtaind after the 50% liquid evaporation is noticed.

Azeotropic or near azeotropic mixtures belong to the cases showing meaningful, both positive and negative, deviations from the Raoult law. As known to the skilled in the art such law is valid for ideal systems.

When such deviations are sufficiently marked, the mixture vapour pressure in the azeotropic point must therefore be characterized by values either lower or higher than those of the pure compounds.

It is evident that, if the mixture vapour pressure curve shows a maximum, this corresponds to a minimum of boiling temperature; viceversa to a vapour pressure minimum value, a maximum of boiling temperature corresponds.

The azeotropic mixture has only one composition for each temperature and pressure value.

However, by changing temperature and pressure, more azeotropic compositions starting from the same components can be obtained.

For example, the combination of all the compositions of the same components which have a minimum or a maximum in the boiling temperature at different pressure levels form an azeotropic composition field.

Hydrofluoropolyethers used in the compositions of the present invention: HFPE1 and HFPE2, are obtained by decarboxylation processes of the alkaline salts obtained by hydrolysis and salification of the corresponding acylfluorides, using processes known in the art. For example, decarboxylation is carried out in the presence of hydrogen-donor compounds, for example water, at temperatures of 1400–170° C. and under a pressure of at least 4 atm. See for example EP 695,775 and the examples reported therein; this patent is herein incorporated by reference.

The characteristics of the two hydrofluoropolyethers used in the compositions of the present invention are reported in Table 1 in comparison with CFC 11 and HCFC 141b as regards ODP and GWP.

It has been found that the near azeotropic compositions of points II, III, IV, V, VI, remain near azeotropic also when a portion of difluoromethoxy-bis(difluoromethyl ether) is substituted with 1-difluoromethoxy-1,1,2,2-tetrafluoroethyl-difluoromethyl ether, up to 40% by weight. They are used as foaming agents.

The same for compositions of points IX and X when a portion of 1-difluoromethoxy-1,1,2,2-tetrafluoroethyl difluoromethyl ether is substituted by difluoromethoxy-bis (difluoromethyl ether), up to 40% by weight. They are used as foaming agents The same for compositions of points I and VII wherein a portion of difluoromethoxy-bis(difluoromethyl ether) is replaced by 1-difluoromethoxy-1,1,2,2-tetrafluoroethyl difluoromethyl ether up to 50% by weight. They are used as foaming agents.

Likewise the compositions of points VIII and X, wherein a portion of 1-difluoromethoxy-1,1,2,2-tetrafluoroethyl difluoromethyl ether is replaced by difluoromethoxy-bis (difluoromethyl ether) up to 50% by weight.

Another object of the present invention are ternary near azeotropic compositions essentially consisting of:

|       |                                                                                      | % by weight |
|-------|--------------------------------------------------------------------------------------|-------------|
| XII)  | difluoromethoxy-bis(difluoromethyl ether) ($HCF_2OCF_2OCF_2H$);                      | 1-64        |
|       | 1,1,1,3,3-pentafluorobutane ($CF_3CH_2CF_2CH_3$, HFC 365 mfc)                        | 98-1        |
|       | hydrocarbon                                                                          | 1-35        |
| XIII) | difluoromethoxy-bis(difluoromethyl ether) ($HCF_2OCF_2OCF_2H$);                      | 1-22        |
|       | 1,1,1,4,4,4-hexafluorobutane ($CF_3CH_2CH_2CF_3$, HFC 356 ffa)                       | 98-43       |
|       | hydrocarbon                                                                          | 1-35        | used as foaming agents.

Among hydrocarbons, n-pentane and iso-pentane are preferred preferably in the range 1–20% by weight.

A further object of the present invention are azeotropic or near azeotropic compositions to be used as foaming agents, as described at points from I) to XIII) and from A) to M), wherein a portion of HFPE1 and/or HFPE2 is replaced by hydrofluoropoly-ethers having the same structure of HFPE1 or HFPE2 but boiling point in the range of 5°–80° C. Therefore, it is possible to refer to fluids consisting essentially of HFPE1 and/or HFPE2.

The compositions mentioned at points I, II, IV, V, VI, VII, VIII, X, A, B, D, E, F, C, H and L are preferred as foaming agents for foamed polyurethanes, and represent a good substitute for CFC 11 for their good balance of foaming properties.

The polyurethane foams produced with the azeotropic or near azeotropic compositions of the present invention are obtained by reaction between polyols and isocyanates in the presence of catalysts and other additives usually employed for preparing polyurethane foams, by using known methods. Depending on the desired foams to be prepared, polyols and isocyanates will be used such as to obtain in combination with the present invention compositions the chemical-physical and mechanical characteristics required for each specific application.

Another advantage of the present invention, in the polyurethane foam preparation field, is that to be able to modulate the affinity of the mentioned mixtures with the different types of polyols used for the different applications in order to obtain the desired manufactured article features in terms of density, mechanical and insulation properties, with the possibility, therefore, of a more generalized use of the foaming agent which changes, depending on the applications, only the composition.

Azeotropic or near azeotropic compositions are added to the formulations in amounts in the range 1–15% by weight on the total preparation, including the same foaming agent. Preferably 1.5–10% by weight, more preferably 1.5–8% by weight on the total formulation for the foam preparation.

The mentioned compositions can be advantageously used in combination with $H_2O$ and/or $CO_2$, for example gas phase.

In particular they can be used in combination with water, as in the past it was done for the CFC 11, CF 11 "reduce"-based formulations and today it is commonly done for the HCFC 141b-based formulations.

Water can be added to the formulations in amount in the range 0.5–7, preferably 1–6, and more preferably 1–4 parts by weight on one hundred parts of polyol.

The $CO_2$ can be used in concentrations in the range 0.6–10 parts, preferably 1–8 parts by weight on one hundred parts by weight of polyol.

The mixtures of the invention can be used in combination with stabilizing agents in order to limit the radicalic decomposition reactions which, as known, are favoured by the temperature, by the presence of metals and by very reactive polyurethane formulations (for example due to polyols and/or catalysts of basic nature used in such formulations).

The degradation reactions especially concerning the mixtures containing HFC 356 ffa and 365 mfc, can be prevented or reduced by the use of nitroparaffins and/or organic substances having double bond double bonds in the molecule.

The stabilizing agents are generally used in amounts of 0.1–5% by weight.

Furthermore the compositions described at points I, II, III, VII, VIII, IX, X, XI, XII, XIII, A, B, C, G, H, I, L, M can be used for the preparation of thermoplastic foams. These compositions can be used as foaming agents above all for foamed polystyrenes and polyethylenes; these materials were prepared in the past by using, as main foaming agents, dichlorofluoromethane (CFC 12), CFC 11 or mixtures thereof. At present polystyrenes and polyethylenes for thermal insulation applications are produced by using HCFC-based mixtures (HCFC 22: chlorotrifluoro methane; HFC 142b: 1 chloro-1,1 difluoro ethane), which however have been restricted for their environmental impact. The above compositions of the invention used for the preparation of foamed polystyrenes and polyethylenes can be advantageously used in combination with foaming agents selected from $CO_2$, HFC 134a (1,1,1,2 tetra-fluoroethane), HFC 227ea, HFC 152a (1,1 difluoroethane), HFC 236ea (1,1,1,2,3,3 hexafluoropropane) and their binary mixtures. The latter can be used in amount up to 95% by weight of the foaming agent. The amount of the foaming agent to be used for the foamed thermoplastic polymer synthesis is in the range 5–30% by weight on the thermoplastic polymer.

The following examples are given for illustrative but not limitative purpose of the present invention.

EXAMPLE 1

Azeotropic or Near Azeotropic Behaviour Evaluation

The mixture of known composition and weight is introduced in a small glass cell, previously evacuated, having an internal volume equal to about 20 $cm^3$, equipped with metal connections, feeding valve and a pressure transducer to evaluate the system vapour pressure.

The filling volumetric ratio is initially equal to about 0.8% v.

The cell is introduced in a thermostatic bath and the temperature is slowly changed until obtaining a vapour pressure equilibrium value equal to 1.013 bar. The corresponding temperature is recorded and it represents the mixture boiling temperature at the 1.013 bar pressure.

The temperature is measured close to the equilibrium cell with a thermometer the accuracy of which is equal to +/−0.01° C.; particular attention was paid so that the external temperature measured in the bath is really the internal one of the cell.

By changing the mixture composition it is possible to estimate possible deviations with respect to the ideality and therefore to identify the azeotropic composition which, as said, will be characterized by an absolute minumum or maximum with respect to the pure components.

In order to confirm the azeotropic or near azeotropic behaviour, the mixture characterized by a minumum or a maximum in the boiling temperature and others identified close to the azeotrope were subjected to evaporation test at the azeotrope constant temperature.

The cell content is removed at constant temperature by evaporation until having a loss corresponding to 50% by weight of the initial amount.

From the evaluation of the initial and final pressure the per cent variation of the vapour pressure is calculated: if the decrease is equal to zero the mixture in those conditions is an azeotrope, if the decrease is <10% its behaviour is of a near azotrope.

It is known that a near aztropic mixture has a behaviour closer and closer to a true azeotrope if the per cent variation is lower and lower and near zero.

As a further confirmation of the azeotropic and near azeotropic behaviour, together with the above reported evaluations, analyses of the composition of some mixtures object of the present invention, have been carried out by gaschromatographic method before and after the evaporation test.

The azeotropic mixtures maintain unchanged, within the limits of the error of the analytical methods, the composition after the liquid evaporation, while in the case of near azeotropic systems, limited composition variations are observed. In all the measurements reported in Tables from 2 to 13 the visual observation of the liquid phase at its normal boiling temperature has at any rate shown that no phase separations took place and that the solutions were limpid and homogeneous.

TABLE 1

Chemical-physical and toxicological characteristics of hydrofluoropolyethers

| Chemical formula | $HCF_2OCF_2OCF_2H$ | $HCF_2OCF_2CF_2OCF_2H$ | $CCl_3F$ CFC 11 | $CCl_2FCH_3$ HCFC 141b |
|---|---|---|---|---|
| Molecular mass | 184.04 | 234.05 | 137.37 | 116.94 |
| ODP CFC 11 = 1 | 0 | 0 | 1 | 0.11 |
| GWP | <10 | <10 | 55 | 10.8 |
| lifetime, years | | | | |

TABLE 2 boiling temperature evaluation at the pressure of 1.013 bar
$HCF_2OCF_2OCF_2H$/n-pentane binary mixture

| COMPOSITION $HCF_2OCF_2OCF_2H$ (% by weight) | BOILING TEMPERATURE (° C.) |
|---|---|
| 0 | 35.79 |
| 12.6 | 26.42 |
| 25.9 | 23.00 |
| 50.0 | 21.45 |
| 61.9 | 21.32 |
| 74.9 | 21.35 |
| 83.4 | 21.49 |
| 87.0 | 21.70 |
| 95.6 | 25.18 |
| 100 | 35.39 |

TABLE 2a evaluation of the azeotropic and near azeotropic behaviour by determination of the vapour pressure per cent variation after evaporation of 50% of the initial liquid mass

| Initial composition (% by wt.) $HCF_2OCF_2OCF2H$/ n-pentane\ | Temperature (° C.) | Initial pressure (bar) | ΔP/P×100 (%) |
|---|---|---|---|
| 61.9/38.1 | 21.32 | 1.013 | 0 |
| 50.3/49.7 | 21.32 | 1.010 | 2.47 |
| 84.3/15.7 | 21.32 | 1.006 | 3.08 |

TABLE 3 evaluation of the boiling temperature at the pressure of 1.013 bar
$HCF_2OCF_2OCF_2H$/iso-pentane binary mixture

| COMPOSITION $HCF_2OCF_2OCF_2H$ (% by wt.) | BOILING TEMPERATURE (° C.) |
|---|---|
| 0 | 27.18 |
| 14.2 | 21.02 |
| 20.4 | 20.00 |
| 39.5 | 17.70 |
| 61.0 | 17.40 |
| 63.1 | 17.35 |
| 80.1 | 17.68 |

TABLE 3-continued evaluation of the boiling temperature at the
pressure of 1.013 bar
$HCF_2OCF_2OCF_2H$/iso-pentane binary mixture

| COMPOSITION $HCF_2OCF_2OCF_2H$ (% by wt.) | BOILING TEMPERATURE (° C.) |
|---|---|
| 90.4 | 19.80 |
| 100 | 35.39 |

TABLE 4a evaluation of the azeotropic and near azeotropic behaviour by determination of the vapour pressure per cent variation after evaporation of 50% of the initial liquid mass

| Initial composition (% by wt.) $HCF_2OCF_2OCF2H$/ iso-pentane | Temperature (° C.) | Initial pressure (bar) | $\Delta P/P \times 100$ (%) |
|---|---|---|---|
| 63.0/37.0 | 17.35 | 1.013 | 0 |
| 39.0/61.0 | 17.35 | 1.003 | 1.49 |
| 79.8/20.2 | 17.35 | 1.003 | 4.79 |

TABLE 4 evaluation of the boiling temperature at the
pressure of 1.013 bar
$HCF_2OCF_2OCF_2H$/acetone binary mixture

| COMPOSITION $HCF_2OCF_2OCF_2H$ (% by wt.) | BOILING TEMPERATURE (° C.) |
|---|---|
| 0 | 56.50 |
| 28.1 | 57.88 |
| 41.7 | 58.11 |
| 51.0 | 57.98 |
| 61.2 | 56.63 |
| 74.8 | 53.62 |
| 100 | 35.39 |

TABLE 4a evaluation of the azeotropic and near azeotropic behaviour by determination of the vapour pressure per cent variation after evaporation of 50% of the initial liquid mass.

| Initial composition (% by wt.) $CHF_2OCF_2OCF_2H$/ acetone | Temperature (° C.) | Initial pressure (bar) | New composition after evaportion of 50% by weight of the liquid (% by wt.) $HCF_2OCF_2OCF_2H$/ acetone | $\Delta P/P \times 100$ (%) |
|---|---|---|---|---|
| 41.7/58.3 | 58.11 | 1.013 | 41.8/58.2 | 0 |
| 28.0/72.0 | 58.11 | 1.021 | 31.1/68.9 | 0.88 |
| 50.4/49.6 | 58.11 | 1.019 | 49.7/50.3 | 1.37 |

TABLE 5 evaluation of the boiling temperature at the
pressure of 1.013 bar
$HCF_2OCF_2OCF_2H$/HFC 365 mfc binary mixture

| COMPOSITION $HCF_2OCF_2OCF_2H$ (% by wt.) | BOILING TEMPERATURE (° C.) |
|---|---|
| 0 | 40.09 |
| 10.0 | 36.89 |
| 20.0 | 34.92 |
| 30.0 | 33.71 |
| 40.1 | 33.01 |
| 50.1 | 32.66 |
| 60.1 | 32.60 |
| 75.0 | 33.13 |
| 80.0 | 33.54 |
| 100 | 35.39 |

TABLE 5a evaluation of the azeotropic and near azeotropic behaviour by determination of the vapour pressure per cent variation after evaporation of 50% of the initial liquid mass

| Initial composition (% by wt.) $HCF_2OCF_2OCF2H$/ HFC 365 mfc | Temperature (° C.) | Initial pressure (bar) | $\Delta P/P \times 100$ (%) |
|---|---|---|---|
| 60.1/39.9 | 32.60 | 1.013 | 0 |
| 21.0/78.9 | 32.60 | 0.937 | 5.21 |
| 82.1/17.9 | 32.60 | 0.968 | 7.73 |

TABLE 6 evaluation of the boiling temperature at the
pressure of 1.013 bar
$HCF_2OCF_2OCF_2H$/HFC 356 ffa binary mixture

| COMPOSITION $HCF_2OCF_2OCF_2H$ (% by wt.) | BOILING TEMPERATURE (° C.) |
|---|---|
| 0 | 24.71 |
| 10.1 | 24.16 |
| 19.9 | 24.05 |
| 29.9 | 24.22 |
| 40.0 | 24.65 |
| 49.9 | 25.29 |
| 60.1 | 26.24 |
| 70.1 | 27.60 |
| 80.1 | 29.65 |
| 100 | 35.39 |

TABLE 6a evaluation of the azeotropic and near azeotropic behaviour by determination of the vapour pressure per cent variation after evaporation of 50% of the initial liquid mass

| Initial composition (% by wt.) $HCF_2OCF_2OCF_2H$/ HFC 356 ffa | Temperature (° C.) | Initial pressure (bar) | $\Delta P/P \times 100$ (%) |
|---|---|---|---|
| 19.9/80.1 | 24.05 | 1.013 | 0 |
| 4.2/95.8 | 24.05 | 1.000 | 0.41 |
| 38.2/61.8 | 24.05 | 0.994 | 2.21 |

TABLE 7 evaluation of the boiling temperature at the
pressure of 1.013 bar
$HCF_2OCF_2OCF_2H$/methoxymethyl methyl ether binary mixture

| COMPOSITION $HCF_2OCF_2OCF_2H$, % by wt. | BOILING TEMPERATURE, ° C. |
|---|---|
| 0 | 41.96 |
| 20.1 | 42.80 |
| 27.5 | 43.05 |
| 38.1 | 43.40 |
| 50.6 | 43.78 |
| 59.1 | 43.74 |
| 60.2 | 43.76 |
| 65.0 | 43.53 |
| 72.1 | 42.95 |
| 78.7 | 41.66 |
| 100 | 35.39 |

TABLE 7a evaluation of the azeotropic and near azeotropic
behaviour by determination of the vapour pressure per cent
variation after evaporation of 50% of the initial liquid mass

| Initial composition (% by wt.) $HCF_2OCF_2OCF_2H$/ methoxymethyl methyl ether | Temperature (° C.) | Initial pressure (bar) | ΔP/P×100 (%) |
|---|---|---|---|
| 59.1/40.9 | 43.74 | 1.013 | 0 |
| 72.1/27.9 | 43.74 | 1.045 | 2.39 |
| 27.5/72.5 | 43.74 | 1.041 | 2.02 |

TABLE 8 evaluation of the boiling temperature at the
pressure of 1.013 bar
$HCF_2OCF_2OCF_2H$/n-hexane binary mixture

| COMPOSITION $HCF_2OCF_2OCF_2H$ (% by wt.) | BOILING TEMPERATURE (° C.) |
|---|---|
| 0 | 68.00 |
| 15.4 | 43.86 |
| 34.0 | 35.15 |
| 50.8 | 33.12 |
| 65.6 | 32.42 |
| 74.7 | 32.10 |
| 78.1 | 32.15 |
| 90.1 | 32.22 |
| 100 | 35.39 |

TABLE 8a evaluation of the azeotropic and near azeotropic
behaviour by determination of the vapour pressure per cent
variation after evaporation of 50% of the initial liquid mass

| Initial composition (% by wt.) $HCF_2OCF_2OCF_2H$/ n-hexane | Temperature (° C.) | Initial pressure (bar) | ΔP/P × 100 (%) |
|---|---|---|---|
| 74.7/25.3 | 32.10 | 1.013 | 0 |
| 65.6/34.4 | 32.10 | 1.006 | 0.60 |
| 90.1/9.9 | 32.10 | 1.011 | 0.89 |

TABLE 9 evaluation of the boiling temperature at the pressure
of 1.013 bar
$HCF_2OCF_2CF_2OCF_2H$/n-pentane binary mixture

| COMPOSITION $HCF_2OCF_2CF_2OCF_2H$ (% by wt.) | BOILING TEMPERATURE (° C.) |
|---|---|
| 0 | 35.79 |
| 17.3 | 31.75 |
| 29.1 | 31.52 |
| 60.8 | 31.2 |
| 68.0 | 31.04 |
| 72.1 | 31.08 |
| 74.3 | 31.15 |
| 79.3 | 31.25 |
| 84.3 | 31.77 |
| 93.4 | 35.83 |
| 100 | 58.21 |

TABLE 9a azeotropic and near azeotropic behaviour evaluation
by determination of the vapour pressure per cent
variation after evaporation of 50% of the initial liquid mass

| Initial composition (% by wt.) $HCF_2OCF_2CF_2OCF_2H$/ n-pentane | Temperature (° C.) | Initial pressure (bar) | ΔP/P × 100 (%) |
|---|---|---|---|
| 60.8/39.2 | 31.02 | 1.013 | 0 |
| 17.3/82.7 | 31.02 | 1.002 | 4.59 |
| 74.3/25.7 | 31.02 | 1.008 | 4.36 |

TABLE 10 boiling temperature evaluation at the pressure of
1.013 bar
$HCF_2OCF_2CF_2OCF_2H$/acetone binary mixture

| COMPOSITION $HCF_2OCF_2CF_2OCF_2H$ (% by wt.) | BOILING TEMPERATURE (° C.) |
|---|---|
| 0 | 56.50 |
| 15.5 | 56.83 |
| 30.8 | 58.23 |
| 40.7 | 59.45 |
| 58.6 | 62.87 |
| 70.0 | 65.04 |
| 79.4 | 65.96 |
| 85.5 | 65.28 |
| 89.9 | 64.41 |
| 100 | 58.21 |

TABLE 10a azeotropic and near azeotropic behaviour evaluation
by determination of the vapour pressure per cent variation
after evaporation of 50% of the initial liquid mass

| Initial composition (% by wt.) $HCF_2OCF_2CF_2OCF_2H$/ acetone | Temperature (° C.) | Initial pressure (bar) | New composition after liquid evaporation of 50% by weight $HCF_2OCF_2CF_2OCF_2H$/ acetone (% by wt.) | ΔP/ P × 100 (%) |
|---|---|---|---|---|
| 79.5/20.5 | 65.96 | 1.013 | 79.3/20.7 | 0 |
| 69.5/30.5 | 65.96 | 1.044 | 73.9/26.1 | 2.78 |
| 84.8/15.2 | 65.96 | 1.035 | 82.5/17.5 | 2.90 |

TABLE 11 boiling temperature evaluation at the pressure of
1.013 bar $HCF_2OCF_2CF_2OCF_2H$/n-hexane binary mixture

| COMPOSITION $HCF_2OCF_2CF_2OCF_2H$ (% by wt.) | BOILING TEMPERATURE (° C.) |
|---|---|
| 0 | 68.00 |
| 20.6 | 56.24 |
| 39.7 | 48.81 |
| 59.9 | 46.74 |
| 73.8 | 46.66 |
| 78.7 | 46.76 |
| 89.9 | 49.00 |
| 100 | 58.21 |

TABLE 11a azeotropic and near azeotropic behaviour evaluation
by determination of the vapour pressure per cent variation
after evaporation of 50% of the initial liquid mass

| Initial composition (% by wt.) $HCF_2OCF_2CF_2OCF_2H$/ n-hexane | Temperature (° C.) | Initial pressure (bar) | $\Delta P/P \times 100$ (%) |
|---|---|---|---|
| 73.8/26.2 | 46.66 | 1.013 | 0 |
| 39.8/60.2 | 46.66 | 0.938 | 7.57 |
| 89.9/10.1 | 46.66 | 0.935 | 8.02 |

TABLE 12 boiling temperature evaluation at the pressure of
1.013 bar $HCF_2OCF_2CF_2OCF_2H$/ethyl alcohol binary mixture

| COMPOSITION $HCF_2OCF_2CF_2OCF_2H$ (% by wt.) | BOILING TEMPERATURE (° C.) |
|---|---|
| 0 | 78.50 |
| 20.6 | 72.35 |
| 48.9 | 63.70 |
| 62.6 | 60.12 |
| 80.0 | 57.33 |
| 89.7 | 56.07 |
| 94.7 | 55.65 |
| 98.0 | 55.75 |
| 99.0 | 56.02 |
| 100 | 58.21 |

TABLE 12a azeotropic and near azeotropic behaviour evaluation by determination of the vapour
pressure per cent variation after evaporation of 50% of the initial liquid mass

| Initial composition (% by wt.) $HCF_2OCF_2CF_2OCF_2H$/ ethyl alcohol | Temperature (° C.) | Initial pressure (bar) | New composition after evaporation of 50% by weight of the liquid (% by wt.) $HCF_2OCF_2CF_2OCF_2H$/ ethyl alcohol | $\Delta P/P \times 100$ (%) |
|---|---|---|---|---|
| 94.7/5.3 | 55.65 | 1.013 | 95.0/5.0 | 0 |
| 79.4/20.6 | 55.65 | 0.954 | 75.6/24.4 | 1.26 |
| 99.0/1.0 | 55.65 | 1.005 | 99.3/0.7 | 2.99 |

TABLE 13 evaluation of the azeotropic behaviour of ternary
mixtures by determination of the vapour pressure per cent
variation after evaporation of 50% of the initial liquid mass
Ternary mixtures

| Initial composition (% by wt) | Boiling temperature (° C.) | Initial pressure (bar) | $\Delta P/P \times 100$ (%) |
|---|---|---|---|
| $HCF_2OCF_2OCF_2H$/$HCF_2OCF_2CF_2OCF_2H$/ acetone 12.0/18.0/70.0 | 57.75 | 1.013 | 3.16 |
| $HCF_2OCF_2OCF_2H$/$HCF_2OCF_2CF_2OCF_2H$ n-pentane 30.0/20.0/50.0 | 25.50 | 1.013 | 0.30 |

EXAMPLE 2

Use of HFPE-based Mixtures as Foaming Agents for the Preparation of Rigid Polyurethanes Foams have been prepared according to the following procedure:

In a polyethylene cylindrical container (diameter 12 cm; height 18 cm) 100 g of polyol, the required water amount for each kind of formualtion and the foaming agent used for the test, are introduced.

The content is mixed with mechanical stirrer for one minute at the rate of 1900 rpm, then isocyanate is added and stirring is continued at the same speed for 15 seconds.

The foam is allowed to freely expand until the completion of the reaction.

A foam portion is drawn in the central part of the foam for the visual observation of the homogeneity, of the cellularity properties of the foam and for the density determination.

The data are reported in Table 15 in comparison with those obtained with CFC 11 and HCFC 141b ($\alpha$ and $\beta$ comparative examples).

TABLE 14

|  | Example α (comp) | Example β (comp) | Example γ | Example δ | Example ε |
|---|---|---|---|---|---|
| Polyol♣ polyether (g) | 100 | 100 | 100 | 100 | 100 |
| Water pbw (g) | 2 | 2 | 2.6 | 2.7 | 2.6 |
| Aminic catalyst ♦ pbw (g) | 2.5 | 2.5 | 2.5 | 2.5 | 2.5 |
| CFC 11 pbw (g) | 30* | | | | |
| HCFC 141b pbw (g) | | 28§ | | | |
| HFPE1/HFC 365 mfc (60/40) pbw (g) | | | 29.8* | | |
| HFPE1/HFC 356 ffa (20)(80) pbw (g) | | | | 28.5* | |
| HFPE1/HFPE2/ n-pentane (18)(72)(10) pbw (g) | | | | | 33* |
| ISOCYANATE♠ pbw (g) | 160 | 160 | 170 | 175 | 170 |
| Density kg/m³ | 30 | 29.7 | 30.0 | 29.8 | 30.0 |
| Foam appearance | GOOD | GOOD | GOOD | GOOD | GOOD |

HFPE1 = HCF$_2$OCF$_2$OCF$_2$H
HFPE2 = HCF$_2$OCF$_2$CF$_2$OCF$_2$H
*non flammable
§flammable
♣polyol polyether with a number of hydroxyl equal to 500 mg KOH/g and containing silicone surfactant
♦N,N-dimethyl cyclohexylamine
♠Polymeric methylendiphenylisocyanate (MDI) - DESMODUR 44V20 by Bayer
pbw: parts by weight per 100 g of polyol The HFPE-based mixtures allow to obtain polyurethane foams with good homogeneity and cellularity characteristics with densities similar to the reference products.

Sufficiently low densities (about 30 Kg/m³) are obtained with amounts of fluorinated foaming agent and water comparable with the amounts used in the reference formulations with CFC 11 and HCFC 141b.

A further advantage given by the mixtures containing HFPE is that to eliminate or limit the inflammability due to the other flammable components present in the mixture (n-pentane, HFC 365 mfc, HFC 356 ffa) with remarkable advantages in terms of foaming agent handling and in terms of reaction with fire of the final polyurethanic manufactured articles.

What is claimed is:

1. A process for foaming polyurethanes, comprising: adding to compositions used to make solid polymers azeotropic or near azeotropic foaming agent compositions as substitutes for CFC 11 to give a homogeneous foam having a density of about 30 kg/cm³, said foaming agent compositions based on difluoromethoxy-bis(difluoromethyl ether) and/or 1-difluoromethoxy-1,1,2,2-tetrafluoroethyl difluoromethyl ether, said foaming agent compositions selected from the group consisting of;

|  |  | composition % by weight |
|---|---|---|
| I) | difluoromethoxy bis(difluoromethyl ether) (HCF$_2$OCF$_2$OCF$_2$H); | 1–95 |
|  | n-pentane | 99–5 |
| II) | difluoromethoxy bis(difluoromethyl ether) (HCF$_2$OCF$_2$OCF$_2$H); | 1–99 |
|  | Iso-pentane | 99–1 |
| III) | difluoromethoxy bis(difluoromethyl ether) (HCF$_2$OCF$_2$OCF$_2$H); | 1–60 |
|  | dimethyl ketone (acetone) | 99–40 |
| VI) | difluoromethoxy bis(difluoromethyl ether) (HCF$_2$OCF$_2$OCF$_2$H); | 1–86 |
|  | methoxymethyl methylether | 99–14 |
| VII) | difluoromethoxy bis(difluoromethyl ether) (HCF$_2$OCF$_2$OCF$_2$H); | 30–99 |
|  | n-hexane | 70–1 |
| VIII) | 1-difluoromethoxy 1,1,2,2-tetrafluoroethyl difluoromethyl ether (HCF$_2$OCF$_2$CF$_2$OCF$_2$H); | 1–93 |
|  | n-pentane | 99–7 |
| IX) | 1-difluoromethoxy 1,1,2,2-tetrafluoroethyl difluoromethyl ether (HCF$_2$OCF$_2$CF$_2$OCF$_2$H); | 30–99 |
|  | dimethyl ketone (acetone) | 70–1 |
| X) | 1-difluoromethoxy 1,1,2,2-tetrafluoroethyl difluoromethyl ether (HCF$_2$OCF$_2$CF$_2$OCF$_2$H); | 15–99 |
|  | n-hexane | 85–1 |

-continued

|  |  | composition % by weight |
|---|---|---|
| XI) | 1-difluoromethoxy 1,1,2,2-tetrafluoroethyl difluoromethyl ether (HCF$_2$OCF$_2$CF$_2$OCF$_2$H); | 5–99 |
|  | ethyl alcohol | 95–1 |
| XII) | difluoromethoxy-bis (difluoromethyl ether) (HCF$_2$OCF$_2$OCF$_2$H); | 1–64 |
|  | 1,1,1,3,3-pentafluorobutane (CF$_3$CH$_2$CF$_2$CH$_3$, HFC 365 mfc) | 98–1 |
|  | a hydrocarbon selected from n-pentane or isopentane | 1–35 and |
| XIII) | difluoromethoxy-bis (difluoromethyl ether) (HCF$_2$OCF$_2$OCF$_2$H); | 1–22 |
|  | 1,1,1,4,4,4-hexafluorobutane (CF$_3$CH$_2$CH$_2$CF$_3$, HFC 356 ffa) | 98–43 |
|  | a hydrocarbon selected from n-pentane or isopentane | 1–35 | wherein (1) in the foaming agent compositions II, III and VI, up to 40% by weight of the difluoromethoxy-bis (difluoromethyl ether) is optionally substituted with 1-difluoro methoxy-1,1,2,2-tetrafluoroethyldifluoromethyl ether;

(2) in the foaming agent composition IX, up to 40% by weight of 1-difluoromethoxy-1,1,2,2-tetrafluoroethyldifluoromethyl ether is optionally substituted by difluoromethoxy-bis(difluoromethyl) ether;

(3) in the foaming agent compositions I and VII, up to 50% by weight of difluoromethoxy-bis(difluoromethyl ether) is optionally substituted by 1-difluoromethoxy-1,1,2,2-tetrafluoroethyldifluoromethyl ether;

(4) in the foaming agent compositions VIII and X, up to 50% by weight of 1-difluoromethoxy-1,1,2,2-tetrafluoroethyldifluoromethyl ether is optionally substituted with difluoromethoxy-bis(difluoromethyl) ether.

2. The process of claim 1, wherein said foaming agent compositions are selected from the group consisting of:

|  |  | composition % by weight |
|---|---|---|
| I) | difluoromethoxy bis(difluoromethyl ether) (HCF$_2$OCF$_2$OCF$_2$H); | 25–95 |
|  | n-pentane | 75–5 |
| II) | difluoromethoxy bis(difluoromethyl ether) (HCF$_2$OCF$_2$OCF$_2$H); | 25–98 |
|  | iso-pentane | 75–2 |
| III) | difluoromethoxy bis(difluoromethyl ether) (HCF$_2$OCF$_2$OCF$_2$H); | 20–60 |
|  | dimethyl ketone (acetone) | 80–40 |
| VI) | difluoromethoxy bis(difluoromethyl ether) (HCF$_2$OCF$_2$OCF$_2$H); | 25–86 |
|  | methoxymethyl methylether | 75–14 |
| VII) | difluoromethoxy bis(difluoromethyl ether) (HCF$_2$OCF$_2$OCF$_2$H); | 35–98 |
|  | n-hexane | 65–2 |

-continued

|  |  | composition % by weight |
|---|---|---|
| VIII) | 1-difluoromethoxy 1,1,2,2-tetrafluoroethyl difluoromethyl ether (HCF$_2$OCF$_2$OCF$_2$H); | 25–93 |
|  | n-pentane | 75–7 |
| IX) | 1-difluoromethoxy 1,1,2,2-tetrafluoroethyl difluoromethyl ether (HCF$_2$OCF$_2$OCF$_2$H); | 50–98 |
|  | dimethyl ketone (acetone) | 50–2 |
| X) | 1-difluoromethoxy 1,1,2,2-tetrafluoroethyl difluoromethyl ether (HCF$_2$OCF$_2$CF$_2$OCF$_2$H); | 25–98 |
|  | n-hexane | 75–2 and |
| XI) | 1-difluoromethoxy 1,1,2,2-tetrafluoroethyl difluoromethyl ether (HCF$_2$OCF$_2$OCF$_2$H); | 10–98 |
|  | ethyl alcohol | 90–2. |

3. The process according to claim 1, wherein the foaming agent compositions are selected from the group consisting of:

|  |  | |
|---|---|---|
| A) | difluoromethoxy-bis (difluoromethyl ether) (HCF$_2$OCF$_2$OCF$_2$H); | 62% by wt. |
|  | n-pentane | 38% by wt. |
| B) | difluoromethoxy-bis(difluoromethyl ether) (HCF$_2$OCF$_2$OCF$_2$H); | 63% by wt. |
|  | iso-pentane | 36% by wt. |
| C) | difluoromethoxy-bis(difluoromethyl ether) (HCF$_2$OCF$_2$OCF$_2$H); | 42% by wt. |
|  | dimethyl ketone (acetone) | 58% by wt. |
| F) | difluoromethoxy-bis(difluoromethyl ether) (HCF$_2$OCF$_2$OCF$_2$H); | 59% by wt. |
|  | methoxymethyl methyl ether | 41% by wt. |
| G) | difluoromethoxy-bis(difluoromethyl ether) (HCF$_2$OCF$_2$OCF$_2$H); | 75% by wt. |
|  | n-hexane | 25% by wt. |
| H) | 1-difluoromethoxy-1,1,2,2-tetrafluoroethyl difluoromethyl ether (HCF$_2$OCF$_2$CF$_2$OCF$_2$H); | 61% by wt. |
|  | n-pentane | 39% by wt. |
| I) | 1-difluoromethoxy-1,1,2,2-tetrafluoroethyl difluoromethyl ether (HCF$_2$OCF$_2$CF$_2$OCF$_2$H); | 79% by wt. |
|  | dimethyl ketone (acetone) | 21% by wt. |
| L) | 1-difluoromethoxy-1,1,2,2-tetrafluoroethyl difluoromethyl ether (HCF$_2$OCF$_2$CF$_2$OCF$_2$H); | 74% by wt. |
|  | n-hexane | 26% by wt. and |
| M) | 1-difluoromethoxy-1,1,2,2-tetrafluoroethyl difluoromethyl ether (HCF$_2$OCF$_2$CF$_2$OCF$_2$H); | 95% by wt. |
|  | ethyl alcohol | 5% by wt. |

4. The process according to claim 1, wherein the hydrocarbon of XII and XIII is n-pentane or isopentane and the hydrocarbon is present in the range 1–20% by weight.

5. The process according to claim 1, wherein for polyurethane foams the compositions are selected from the group consisting of:

|  |  | composition % by weight |
|---|---|---|
| I) | difluoromethoxy bis(difluoromethyl ether) (HCF$_2$OCF$_2$OCF$_2$H); | 1–95 |
|  | n-pentane | 99–5 |
| II) | difluoromethoxy bis(difluoromethyl ether) (HCF$_2$OCF$_2$OCF$_2$H); | 1–99 |
|  | iso-pentane | 99–1 |
| VI) | difluoromethoxy bis(difluoromethyl ether) (HCF$_2$OCF$_2$OCF$_2$H); | 1–86 |
|  | methoxymethyl methylether | 99–14 |
| VII) | difluoromethoxy bis(difluoromethyl ether) (HCF$_2$OCF$_2$OCF$_2$H); | 30–99 |
|  | n-hexane | 70–1 |
| VIII) | 1-difluoromethoxy 1,1,2,2-tetrafluoroethyl difluoromethyl ether (HCF$_2$OCF$_2$CF$_2$OCF$_2$H); | 1–93 |
|  | n-pentane | 99–7 and |
| X) | 1-difluoromethoxy 1,1,2,2-tetrafluoroethyl difluoromethyl ether (HCF$_2$OCF$_2$CF$_2$OCF$_2$H); | 15–99 |
|  | n-hexane | 85–1. |

6. The process according to claim 5, wherein said compositions are added in amounts in the range 1–15% by weight based on the total preparation.

7. The process according to claim 5, wherein the compositions are used in combination with H$_2$O and/or CO$_2$.

8. The process according to claim 7 wherein the water amount is in the range 0.5–7 parts by weight on one hundred parts of polyol.

9. The process according to claim 7 wherein the CO$_2$ amount is in the range 0.6–10 parts by weight on one hundred parts of polyol.

10. The process according to claim 5, wherein for polyurethane foams the compositions are selected from the group consisting of:

|  |  | composition % by weight |
|---|---|---|
| A) | difluoromethoxy-bis (difluoromethyl ether) (HCF$_2$OCF$_2$OCF$_2$H); | 62% by wt. |
|  | n-pentane | 38% by wt. |
| B) | difluoromethoxy-bis(difluoromethyl ether) (HCF$_2$OCF$_2$OCF$_2$H); | 63% by wt. |
|  | iso-pentane | 36% by wt. |
| F) | difluoromethoxy-bis(difluoromethyl ether) (HCF$_2$OCF$_2$OCF$_2$H); | 59% by wt. |
|  | methoxymethyl methyl ether | 41% by wt. |
| G) | difluoromethoxy-bis(difluoromethyl ether) (HCF$_2$OCF$_2$OCF$_2$H); | 75% by wt. |
|  | n-hexane | 25% by wt. |
| H) | 1-difluoromethoxy-1,1,2,2-tetrafluoroethyl difluoromethyl ether (HCF$_2$OCF$_2$CF$_2$OCF$_2$H); | 61% by wt. |
|  | n-pentane | 39% by wt. and |

|  |  | composition % by weight |
|---|---|---|
| L) | 1-difluoromethoxy-1,1,2,2-tetrafluoroethyl difluoromethyl ether (HCF$_2$OCF$_2$CF$_2$OCF$_2$H); | 74% by wt. |
|  | n-hexane | 26% by wt. |

11. The process according to claim 1 wherein stabilizers for radicalic decomposition reactions are added, the concentration of which is in the range 0.1–5% by weight with respect to the foaming agent.

12. Thermoplastic polymer compositions comprising the foaming compositions selected from the group consisting of:

|  |  | composition % by weight |
|---|---|---|
| I) | difluoromethoxy bis(difluoromethyl ether) (HCF$_2$OCF$_2$OCF$_2$H); | 1–95 |
|  | n-pentane | 99–5 |
| II) | difluoromethoxy bis(difluoromethyl ether) (HCF$_2$OCF$_2$OCF$_2$H); | 1–99 |
|  | iso-pentane | 99–1 |
| III) | difluoromethoxy bis(difluoromethyl ether) (HCF$_2$OCF$_2$OCF$_2$H); | 1–60 |
|  | dimethyl ketone (acetone) | 99–40 |
| VII) | difluoromethoxy bis(difluoromethyl ether) (HCF$_2$OCF$_2$OCF$_2$H); | 30–99 |
|  | n-hexane | 70–1 |
| VIII) | 1-difluoromethoxy 1,1,2,2-tetrafluoroethyl difluoromethyl ether (HCF$_2$OCF$_2$CF$_2$OCF$_2$H); | 1–93 |
|  | n-pentane | 99–7 |
| IX) | 1-difluoromethoxy 1,1,2,2-tetrafluoroethyl difluoromethyl ether (HCF$_2$OCF$_2$CF$_2$OCF$_2$H); | 30–99 |
|  | dimethyl ketone (acetone) | 70–1 |
| X) | 1-difluoromethoxy 1,1,2,2-tetrafluoroethyl difluoromethyl ether (HCF$_2$OCF$_2$CF$_2$OCF$_2$H); | 15–99 |
|  | n-hexane | 85–1 |
| XI) | 1-difluoromethoxy 1,1,2,2-tetrafluoroethyl difluoromethyl ether (HCF$_2$OCF$_2$CF$_2$OCF$_2$H); | 5–99 |
|  | ethyl alcohol | 95–1 |
| XII) | difluoromethoxy-bis (difluoromethyl ether) (HCF$_2$OCF$_2$OCF$_2$H); | 1–64 |
|  | 1,1,1,3,3-pentafluorobutane (CF$_3$CH$_2$CF$_2$CH$_3$, HFC 365 mfc) | 98–1 |
|  | a hydrocarbon selected from n-pentane or isopentane | 1–35 and |
| XIII) | difluoromethoxy-bis (difluoromethyl ether) (HCF$_2$OCF$_2$OCF$_2$H); | 1–22 |
|  | 1,1,1,4,4,4-hexafluorobutane (CF$_3$CH$_2$CH$_2$CF$_3$, HFC 356 ffa) | 98–43 |
|  | a hydrocarbon selected from n-pentane or isopentane | 1–35. |

13. Thermoplastic polymer compositions according to claim 12 comprising foaming compositions selected from the group consisting of:

|    |                                                                                              | composition % by weight |
|----|----------------------------------------------------------------------------------------------|------------------------|
| A) | difluoromethoxy-bis (difluoromethyl ether) ($HCF_2OCF_2OCF_2H$); n-pentane                   | 62% by wt. 38% by wt.  |
| B) | difluoromethoxy-bis(difluoromethyl ether) ($HCF_2OCF_2OCF_2H$); iso-pentane                  | 63% by wt. 36% by wt.  |
| C) | difluoromethoxy-bis(difluoromethyl ether) ($HCF_2OCF_2OCF_2H$); dimethyl ketone (acetone)    | 42% by wt. 58% by wt.  |
| G) | difluoromethoxy-bis(difluoromethyl ether) ($HCF_2OCF_2OCF_2H$); n-hexane                     | 75% by wt. 25% by wt.  |
| H) | 1-difluoromethoxy-1,1,2,2-tetrafluoroethyl difluoromethyl ether ($HCF_2OCF_2CF_2OCF_2H$); n-pentane | 61% by wt. 39% by wt. |
| I) | 1-difluoromethoxy-1,1,2,2-tetrafluoroethyl difluoromethyl ether ($HCF_2OCF_2CF_2OCF_2H$); dimethyl ketone (acetone) | 79% by wt. 21% by wt. |
| L) | 1-difluoromethoxy-1,1,2,2-tetrafluoroethyl difluoromethyl ether ($HCF_2OCF_2CF_2OCF_2H$); n-hexane | 74% by wt. 26% by wt. and |
| M) | 1-difluoromethoxy-1,1,2,2-tetrafluoroethyl difluoromethyl ether ($HCF_2OCF_2CF_2OCF_2H$); ethyl alcohol | 95% by wt. 5% by wt. |

14. Polyurethane polymer compositions comprising, as blowing agent substitutes of CFC-11 to give a homogenous foam having density of about 30 Kg/cm³, foaming agent azeotropic or nearly azeotropic compositions selected from the group consuming of:

|     |                                                                                   | composition % by weight |
|-----|-----------------------------------------------------------------------------------|------------------------|
| I)  | difluoromethoxy bis(difluoromethyl ether) ($HCF_2OCF_2OCF_2H$); n-pentane        | 1–95 99–5              |
| II) | difluoromethoxy bis(difluoromethyl ether) ($HCF_2OCF_2OCF_2H$); iso-pentane      | 1–99 99–1              |
| VI) | difluoromethoxy bis(difluoromethyl ether) ($HCF_2OCF_2OCF_2H$); methoxymethyl methylether | 1–86 99–14     |
| VII)| difluoromethoxy bis(difluoromethyl ether) ($HCF_2OCF_2OCF_2H$); n-hexane         | 30–99 70–1 and         |
| VIII)| 1-difluoromethoxy 1,1,2,2-tetrafluoroethyl difluoromethyl ether ($HCF_2OCF_2CF_2OCF_2H$); n-pentane | 1–93 99–7 |
| X)  | 1-difluoromethoxy 1,1,2,2-tetrafluoroethyl difluoromethyl ether ($HCF_2OCF_2CF_2OCF_2H$); n-hexane | 15–99 85–1. |

15. Polyurethane polymer compositions according to claim 14 comprising foaming agents selected from the group consisting of:

|    |                                                                                              | composition % by weight |
|----|----------------------------------------------------------------------------------------------|------------------------|
| A) | difluoromethoxy-bis (difluoromethyl ether) ($HCF_2OCF_2OCF_2H$); n-pentane                   | 62% by wt. 38% by wt.  |
| B) | difluoromethoxy-bis(difluoromethyl ether) ($HCF_2OCF_2OCF_2H$); iso-pentane                  | 63% by wt. 36% by wt.  |
| F) | difluoromethoxy-bis(difluoromethyl ether) ($HCF_2OCF_2OCF_2H$); methoxymethyl methyl ether   | 59% by wt. 41% by wt.  |
| G) | difluoromethoxy-bis(difluoromethyl ether) ($HCF_2OCF_2OCF_2H$); n-hexane                     | 75% by wt. 25% by wt.  |
| H) | 1-difluoromethoxy-1,1,2,2-tetrafluoroethyl difluoromethyl ether ($HCF_2OCF_2CF_2OCF_2H$); n-pentane | 61% by wt. 39% by wt. and |
| L) | 1-difluoromethoxy-1,1,2,2-tetrafluoroethyl difluoromethyl ether ($HCF_2OCF_2CF_2OCF_2H$); n-hexane | 74% by wt. 26% by wt. |

* * * * *